(12) United States Patent
Cain

(10) Patent No.: US 6,375,117 B1
(45) Date of Patent: Apr. 23, 2002

(54) FLYING VEHICLE AND METHOD

(76) Inventor: David H. Cain, 10815 N. Sundown Dr., Scottsdale, AZ (US) 85260

( * ) Notice: Subject to any disclaimer, the term of this patent is extended or adjusted under 35 U.S.C. 154(b) by 0 days.

(21) Appl. No.: 09/779,576

(22) Filed: Feb. 9, 2001

(51) Int. Cl.[7] .............................................. B64C 29/00
(52) U.S. Cl. ...................... 244/23 R; 244/55; 244/73 C; 244/73 B; 244/23 C; 244/4 A
(58) Field of Search .................. 244/23 R, 55, 244/73 C, 73 B, 17.11, 6, 7 B, 23 C, 4 A, 73 R

(56) References Cited

U.S. PATENT DOCUMENTS

| | | | | |
|---|---|---|---|---|
| 4,214,720 A | * | 7/1980 | DeSautel | 244/12.2 |
| 5,031,859 A | * | 7/1991 | Cunningham | 244/12.1 |
| 5,054,713 A | * | 10/1991 | Langley et al. | 244/12.2 |
| 6,270,036 B1 | * | 8/2001 | Lowe, Jr. | 244/12.2 |

* cited by examiner

*Primary Examiner*—J. Woodrow Eldred
(74) *Attorney, Agent, or Firm*—Jeffrey Weiss; Harry M. Weiss; Weiss & Moy, P.C.

(57) ABSTRACT

A vertically ascending flying vehicle and method. The flying vehicle consists of a body, which may be in the shape of a saucer or an airfoil, and an engine located above the body. The engine generates thrust downward onto the top of the body. That thrust causes the body to vertically ascend. To permit horizontal flight, the engine may be rotatable, so that it may alternatively provide vertical or horizontal thrust as desired.

12 Claims, 2 Drawing Sheets

FLYING VEHICLE AND METHOD

FIELD OF THE INVENTION

This invention relates generally to flying vehicles and methods and, more specifically, to a flying vehicle and method wherein lift is achieved by providing thrust downward from above the flying vehicle.

BACKGROUND OF THE INVENTION

Heavier than air flying vehicles can generally be separated into two categories: (a) winged aircraft; and (b) wingless rockets. Generally, with respect to aircraft, flight is achieved when an engine generated thrust horizontally, in a horizontal plane, in an amount sufficient to overcome the aerodynamic drag of the aircraft's body, creating a vertical lift force large enough to overcome the weight of the aircraft. For wingless rockets, flight occurs when the engine produces a vertical thrust force projected at the ground that is at least equal to the weight of the vehicle.

Because an aircraft uses an airfoil as a thrust amplifier, the thrust requirement of an aircraft is much less than that of a wingless rocket. On the other hand, while a wingless rocket can take off vertically, aircraft generally cannot—unless they are able to generate vertical thrust, like the Harrier or the Osprey.

Where vertical take-off is desired for a wingless rocket or aircraft, there has not been a ready alternative to a design in which vertical thrust is generated vertically toward the ground. A need for such an alternative has existed. It is the object of the present invention to satisfy such need, and to provide other, related, advantages.

SUMMARY OF THE INVENTION

An object of the present invention is to provide a flying vehicle and method permitting vertical take-off without the projection of thrust vertically toward the ground.

A further object of the present invention is to provide a flying vehicle and method permitting vertical take-off by causing a drop in atmospheric pressure above the flying vehicle.

A still further object of the present invention is to provide a flying vehicle and method permitting vertical take-off by causing a drop in atmospheric pressure above the flying vehicle, wherein such drop in atmospheric pressure is caused by the artificially induced movement of air above the flying vehicle.

BRIEF DESCRIPTION OF THE PREFERRED EMBODIMENTS

In accordance with one embodiment of the present invention, a vertically ascending flying vehicle is disclosed. The vertically ascending flying vehicle comprises, in combination: a body; and means for reducing pressure above said body sufficiently to cause said body to ascend vertically.

In accordance with another embodiment of the present invention, a method for achieving a vertical take-off in a flying vehicle is disclosed. The method comprises: providing a body; providing means for reducing pressure above said body; and reducing said pressure above said body sufficiently to cause said body to ascend vertically.

In accordance with still another embodiment of the present invention, a vertically ascending flying vehicle is disclosed. The vertically ascending flying vehicle comprises, in combination: a body; and an engine located above a center of said body and adapted to produce thrust downward onto said body with sufficient force to cause said body to ascend vertically.

The foregoing and other objects, features, and advantages of the invention will be apparent from the following, more particular description of the preferred embodiments of the invention, as illustrated in the accompanying drawings.

DETAILED DESCRIPTION OF THE PREFERRED EMBODIMENTS

Figure 1:
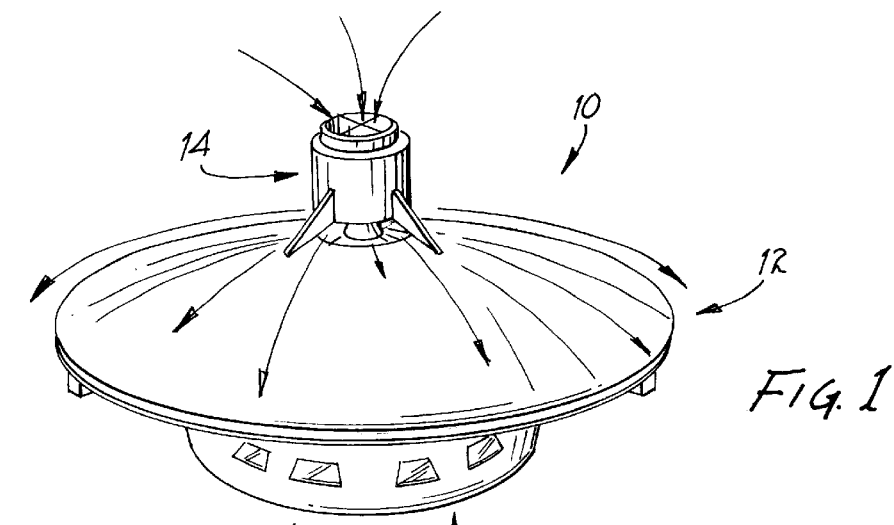
FIG. 1 is a perspective view of an embodiment of the flying vehicle of the present invention.
Figure 3:
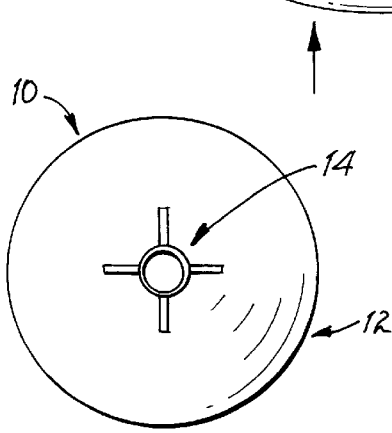
FIG. 3 is a top view of the flying vehicle of FIG. 1.
Figure 2:
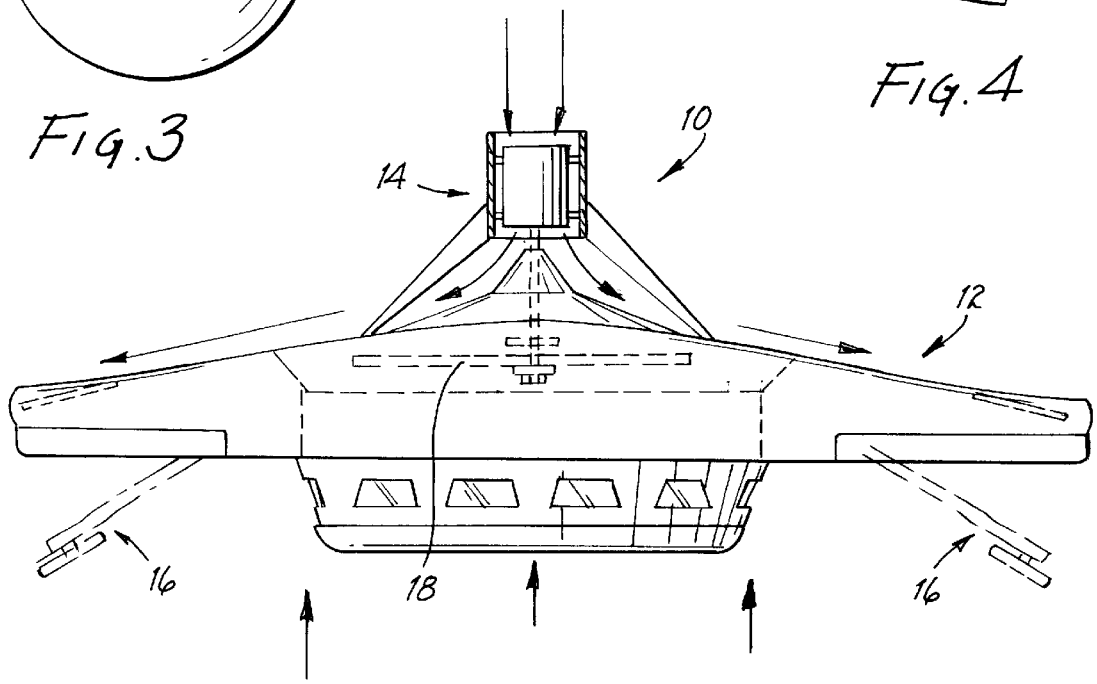
FIG. 2 is a front view of the flying vehicle of FIG. 1.

Referring first to FIGS. 1–4, an embodiment of a flying vehicle 10 of the present invention is illustrated. Referring specifically to FIGS. 1 and 2, the flying vehicle 10 generally comprises a body 12, above which is positioned an engine 14. In this embodiment, the body 12 is preferably saucer-shaped. The body 12 can be of any desired size—from that suitable for use by a model builder to one suitable for carrying a payload as well as to one suitable for carrying human passengers.

The engine 14 is preferably positioned substantially above the center of the body 12. It is believed, however, that the positioning of the engine 14 away from the center of the body 12, while still above a portion of the body 12, would still generate lift, although perhaps in a less stable manner.

The engine 14 may be of any desired type necessary to provide the thrust and/or pressure reducing characteristics needed to cause the body 12 to ascend vertically. It has been shown experimentally that the application of thrust downward from the engine 14 onto the top of the body 12, as indicated by the direction of the arrows from the engine 14, will cause the body 12 to ascend vertically. It is believed that such vertical ascent is as a result of the reduction in atmospheric pressure above the body 12 relative to that below the body 12. It is, however, possible that, in whole or in part, there is another explanation for such phenomenon. It is further believed that vertical ascent may be achieved with the application of thrust in an amount less than would be required in a classic wingless rocket configuration, where the rocket engine projects its thrust from below the rocket body toward the ground.

The engine 14 may be of any type suitable for generating sufficient airflow and the corresponding drop in atmospheric pressure to achieve vertical ascent. It may be a solid fuel rocket, a liquid fuel rocket, a turbo fan, a jet engine, a fan, a propeller (such as a helicopter rotor) or other device capable of generating sufficient airflow. Moreover, it could also be other means capable of creating air flow and a related drop in atmospheric pressure above the body 12, such as the combustion of fuel above the body 12.

Figure 4:
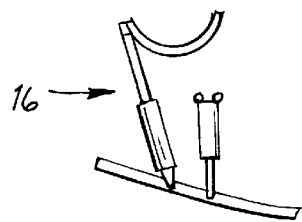
FIG. 4 is a side view of landing gear for the flying vehicle of FIG. 1.

Referring now to FIGS. 2 and 4, some additional features of the flying vehicle 10 are shown. Thus, the flying vehicle 10 may include landing gear 16, which landing gear 16 may be made retractable into the bottom of the body 12 as illustrated in FIG. 2.

Referring specifically to FIG. 2, it may be desirable to provide means for stabilizing the flight of the body 12. This could be accomplished, for example, by positioning a wheel 18 within the body 12, which wheel 18 would be rotated by power from the engine 14 or some other power source. The rotation of the wheel 18 will impart stability to the body 12 during ascent and flight.

Figure 5:
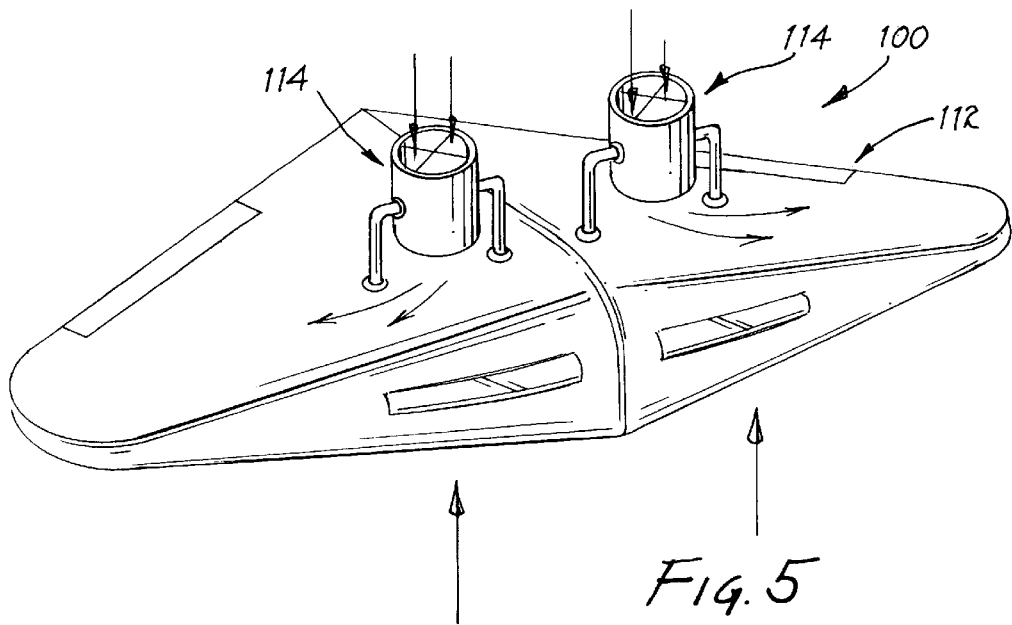
FIG. 5 is a perspective view of another embodiment of the flying vehicle of the present invention.
Figure 6:
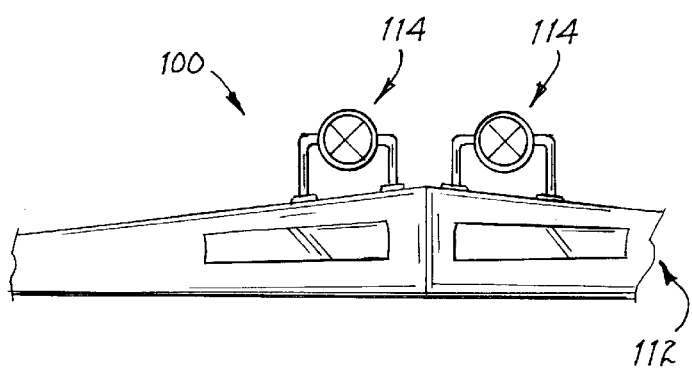
FIG. 6 is a front view of the flying vehicle of FIG. 5.
Figure 7:
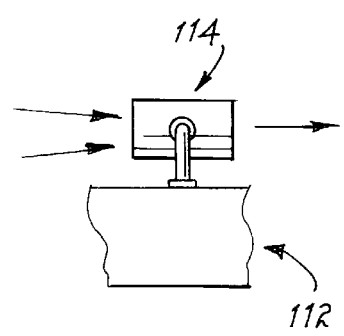
FIG. 7 is a side view of the flying vehicle of FIG. 5.

Referring now to FIGS. 5–7, another embodiment of the flying vehicle of the present invention, herein a flying vehicle 100, is shown. The flying vehicle 100 comprises a body 112 and at least one engine 114. The body 112, in this embodiment, is an airfoil, such as a wing. Each engine 114 may be of any desired type as described above with respect to the engine 14. As shown in FIGS. 5 and 6, there can be two engines 114. It would be possible to provide only one engine 114, or more than two engines 114, as desired for purposes of achieving proper thrust and stability.

Referring specifically to FIGS. 6 and 7, illustrated is the manner in which the engines 114 may be used to generate horizontal as well as vertical flight. Thus, the engines 114 may be made to rotate after the body 112 has achieved lift-off, so that thrust is now imparted horizontally. This horizontal thrust will generate horizontal movement in the direction opposite that of the thrust, with the shape of the airfoil permitting the body 112 to remain in flight. The rotation of the engines 114 is an example of one manner in which horizontal flight can be achieved. It would be possible to achieve such flight in other ways. For example, it would be possible to provide one or more engines 114 having a fixed vertical orientation, and one or more engines 114 having a fixed horizontal orientation, with the vertical and horizontal engines 114 being used as desired to achieve vertical ascent or horizontal flight.

While the invention has been particularly shown and described with reference to preferred embodiments thereof, it will be understood by those skilled in the art that the foregoing and other changes in form and details may be made therein without departing from the spirit and scope of the invention.

I claim:

1. A vertically ascending flying vehicle comprising, in combination:

a body;

means for reducing pressure above said body sufficiently to cause said body to ascend vertically;

wherein said means comprises an engine located above said body and adapted to produce thrust in a downward direction.

2. The flying vehicle of claim 1 wherein said engine comprise a rocket engine.

3. The flying vehicle of claim 1 further comprising means for stabilizing said body during flight.

4. The flying vehicle of claim 3 wherein said stabilizing means comprises a rotating wheel.

5. The flying vehicle of claim 1 further comprising means for causing said body to fly horizontally.

6. The flying vehicle of claim 5 wherein said horizontal flight means comprises an engine located above said body and wherein said engine is adapted to rotate so as to be able to produce thrust in each of a vertical and horizontal direction.

7. A method for achieving a vertical take-off in a flying vehicle comprising:

providing a body;

providing means for reducing pressure above said body;

wherein said means comprises an engine located above said body and adapted to produce thrust in a downward direction;

reducing said pressure above said body sufficiently to cause said body to ascend vertically.

8. The method of claim 7 wherein said engine comprises a rocket engine.

9. The method of claim 7 further comprising providing means for stabilizing said body during flight.

10. The method of claim 9 wherein said stabilizing means comprises a rotating wheel.

11. The method of claim 7 further comprising providing means for causing said body to fly horizontally.

12. The method of claim 11 wherein said horizontal flight means comprises an engine located above said body and wherein said engine is adapted to rotate so as to be able to produce thrust in each of a vertical and horizontal direction.

* * * * *